(12) United States Patent
Hosokawa

(10) Patent No.: US 8,587,802 B2
(45) Date of Patent: Nov. 19, 2013

(54) SELECTING PRINT JOBS BASED ON DETECTED USER PRESENCE AND WAIT TIME

(75) Inventor: Takahiro Hosokawa, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1219 days.

(21) Appl. No.: 12/140,712

(22) Filed: Jun. 17, 2008

(65) Prior Publication Data

US 2009/0021783 A1    Jan. 22, 2009

(30) Foreign Application Priority Data

Jul. 16, 2007   (JP) .................... 2007-185115

(51) Int. Cl.
- G06F 3/12 (2006.01)
- G06F 15/00 (2006.01)
- G06K 1/00 (2006.01)

(52) U.S. Cl.
USPC ............ 358/1.15; 358/1.9; 358/1.13

(58) Field of Classification Search
None
See application file for complete search history.

(56) References Cited

U.S. PATENT DOCUMENTS

| | | | |
|---|---|---|---|
| 6,151,464 A | 11/2000 | Nakamura et al. | |
| 7,248,385 B2 | 7/2007 | Murakami et al. | |
| 2001/0038461 A1* | 11/2001 | Murakami et al. | 358/1.13 |
| 2002/0039195 A1* | 4/2002 | Miyake | 358/1.15 |
| 2002/0135796 A1* | 9/2002 | Alexander | 358/1.15 |
| 2002/0194180 A1* | 12/2002 | Alsop et al. | 707/10 |
| 2003/0081242 A1* | 5/2003 | Simpson et al. | 358/1.15 |
| 2006/0001898 A1* | 1/2006 | Maeshima et al. | 358/1.14 |
| 2006/0029412 A1* | 2/2006 | Kato et al. | 399/80 |
| 2007/0109590 A1* | 5/2007 | Hagiwara | 358/1.15 |

FOREIGN PATENT DOCUMENTS

| | | |
|---|---|---|
| JP | 09-107426 | 4/1997 |
| JP | 2000-177212 A | 6/2000 |
| JP | 2001-202213 A | 7/2001 |
| JP | 2001-202217 A | 7/2001 |
| JP | 2005-205741 | 8/2005 |
| JP | 2006-027170 | 2/2006 |
| JP | 2006-047765 | 2/2006 |
| JP | 2007-098590 A | 4/2007 |

OTHER PUBLICATIONS

JP Office Action dtd Jun. 23, 2009, JP Appln. 2007-185115.
JP Notification of Reasons for Rejection dated Sep. 13, 2011, corresponding JP Application No. 2009-277275; English Abstract.

* cited by examiner

*Primary Examiner* — Ming Hon
(74) *Attorney, Agent, or Firm* — Banner & Witcoff, Ltd.

(57) ABSTRACT

There is provided a print system, comprising: a user ID obtaining unit configured to obtain a user ID from a memory device through wireless communication; a waiting time obtaining unit configured to obtain time information concerning a waiting time for which a user corresponding to the obtained user ID waits for execution of a print job, based on operations to obtain a user ID by the user ID obtaining unit; and a print control unit configured to select a print job in accordance with the obtained time information, from among a plurality of print jobs, and to execute the selected print job.

20 Claims, 10 Drawing Sheets

| USER NAME | JOB NAME | WAITING TIME | RANK |
|---|---|---|---|
| USER A | JOB 1, JOB 5 | 300 SECONDS | 3 |
| USER B | JOB 2, JOB 4 | 100 SECONDS | 2 |
| USER C | JOB 3 | 150 SECONDS | 1 |

| USER NAME | JOB NAME | WAITING TIME | RANK |
|---|---|---|---|
| USER A | JOB 1 | 200 SECONDS | 1 |
| USER B | JOB 2 | 120 SECONDS | 2 |
| USER C | JOB 3 | 30 SECONDS | 4 |
| USER B | JOB 4 | 10 SECONDS | 5 |
| USER A | JOB 5 | 50 SECONDS | 3 |

FIG.13

SELECTING PRINT JOBS BASED ON DETECTED USER PRESENCE AND WAIT TIME

CROSS-REFERENCE TO RELATED APPLICATION

This application claims priority under 35 U.S.C. §119 from Japanese Patent Application No. 2007-185115, filed on Jul. 16, 2007. The entire subject matter of the application is incorporated herein by reference.

BACKGROUND

1. Technical Field

Aspects of the present invention relate to a print system configured to control print jobs based on information obtained from IC tags.

2. Related Art

In general, image forming devices, such as a printer, store print jobs in a print queue and execute the print jobs successively. Recently, image forming devices configured to increase or decrease the priority of one or some of print jobs on an as needed basis in order to change the order in which the print jobs are executed have been proposed.

Japanese Patent Provisional Publication No. 2006-27170 (hereafter, referred to as JP 2006-27170A) discloses an example of an image forming device configured to change the order in which print jobs are executed. The image forming device disclosed in JP 2006-27170A is provided with an IC tag reader to identify a user around the image forming device through wireless communication. With this configuration, the image forming device is able to change the priority of execution of the print job of the user.

SUMMARY

However, the image forming device disclosed in JP 2006-27170A is predicated on the fact that only one user is around the image forming device. In other words, the image forming device does not consider a situation where a plurality of user's are around the image forming device. If a plurality of users are around the image forming device, the priorities of print jobs of the users may conflict with each other. In this case, the image forming device is not able to appropriately control the order in which the print jobs are executed.

Aspects of the present invention are advantageous in that a print system and an image forming device configured to control print jobs smoothly and appropriately even if a plurality of users are around an image forming device can be provided.

According to an aspect of the invention, there is provided a print system, comprising: a user ID obtaining unit configured to obtain a user ID from a memory device through wireless communication; a waiting time obtaining unit configured to obtain time information concerning a waiting time for which a user corresponding to the obtained user ID waits for execution of a print job, based on operations to obtain a user ID by the user ID obtaining unit; and a print control unit configured to select a print job in accordance with the obtained time information, from among a plurality of print jobs, and to execute the selected print job.

With this configuration, it is possible to determine a print job having the highest immediacy even if a plurality of users are waiting for execution of print jobs. Consequently, it becomes possible to smoothly and appropriately execute print jobs in a situation where a plurality of users are waiting for execution of print jobs.

According to another aspect of the invention, there is provided an image forming device, comprising: a user ID obtaining unit configured to obtain a user ID from a memory device through wireless communication; a waiting time obtaining unit configured to obtain time information concerning a waiting time for which a user corresponding to the obtained user ID waits for execution of a print job, based on operations to obtain a user ID by the user ID obtaining unit; and a print control unit configured to select a print job in accordance with the obtained time information, from among a plurality of print jobs, and to execute the selected print job.

With this configuration, it is possible to determine a print job having the highest immediacy even if a plurality of users are waiting for execution of print jobs. Consequently, it becomes possible to smoothly and appropriately execute print jobs in a situation where a plurality of users are waiting for execution of print jobs.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 13 illustrates an example of a waiting time table created through the table managing process shown in FIG. 12.

DETAILED DESCRIPTION

Hereafter, an embodiment according to the invention will be described with reference to the accompanying drawings.

Figure 1:
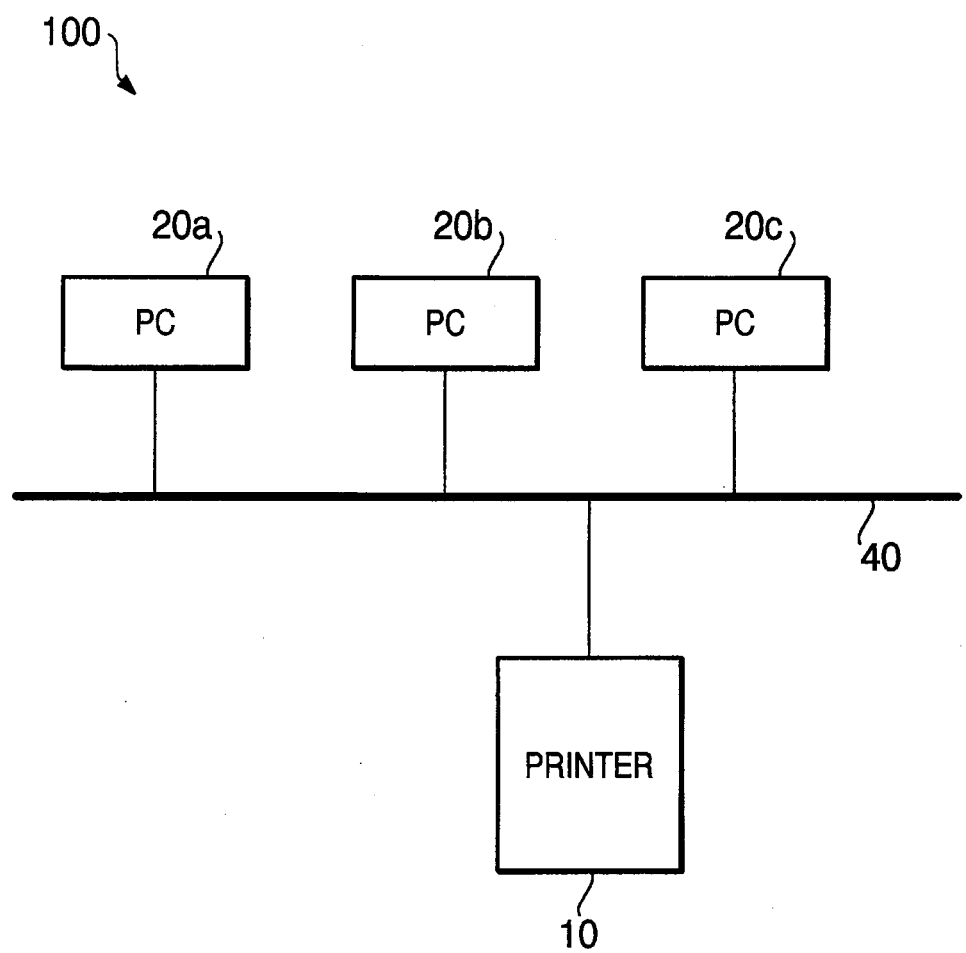
FIG. 1 illustrates a system configuration of a print system according to an embodiment.

FIG. 1 illustrates a system configuration of a print system 100 according to an embodiment. The print system 100 includes a printer 10 functioning as an image forming device, and PCs 20a, 20b and 20c. As shown in FIG. 1, the printer 10 and the PCs 20a, 20b and 20c are connected to each other via a network 40. Although in FIG. 1 one printer and three PCs are illustrated, two or more printers and three or more PCs may be provided in the print system 100. The number of PCs may be one or two.

In the print system 100, a user of the PC 20a, 20b, or 20c edits documents, drawings, tables or image data (e.g., photographic image data) through application software running on the PC 20a, 20b or 20c. The PC 20a, 20b or 20c transmits print data to the printer 10 in response to a user command to print an image corresponding to the print data through the printer 10. More specifically, in response to a user command, the PC 20a, 20b or 20c transmits print data and related information including a user ID to the printer 10 so as to enable the printer 10 to manage a print job in association with a user ID.

Figure 2:
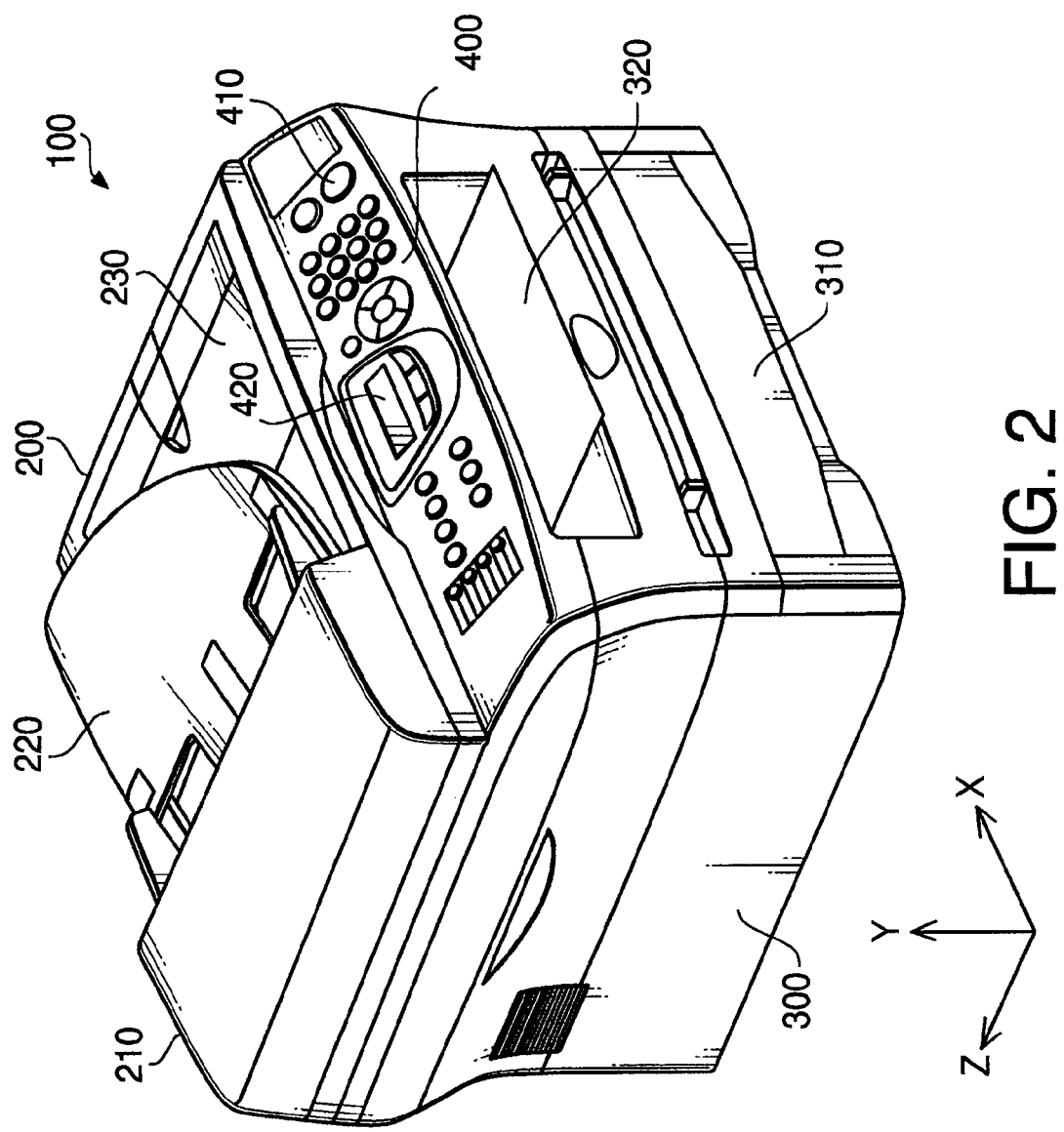
FIG. 2 is a perspective view illustrating an outer appearance of a printer provided in the print system.

In this embodiment, the printer 10 is a multifunction peripheral provided with a copying function. FIG. 2 is a perspective view illustrating an outer appearance of the printer 10. As shown in FIG. 2, the printer 10 includes an image reading unit 200 configured to read an image from a document, an image formation unit 300 configured to form an image on a recording medium, for example, in accordance with image data read from the document by the image reading unit, and an operation unit 400 used by a user to operate the printer 10.

The copying function is executed through the image reading unit 200. More specifically, the image reading unit 200 includes an ADF (Automatic Document Feeder) 210, a sheet supply tray 220 in which a document to be read is placed, and a paper output tray 230 to which a document which has been subjected to a reading operation is ejected. The paper output tray 230 is attached to a main body of the printer 100 to be openable and closable with respect to the main body.

Under paper output tray 230, a glass place on which a document can be placed is provided. Under the glass place, a CCD sensor which reads a document is provided. The reading operation can be executed in two ways as explained below. That is, when the user operates the printer 100 to start the reading operation after the user places a document on the glass plate provided under the paper output tray 230, the printer 10 moves the CCD sensor along the glass plate in the X-direction to read the document on a line-by-line basis.

On the other hand, if a document is placed on the ADF 210 and the user instructs the printer 10 to start the reading operation, the document is carried by the ADF 210, and the document is read, on a line-by-line basis, by the CCD sensor fixed at the left edge position under the glass plate.

The image formation unit 300 includes a sheet supply cassette 310 which is detachably attachable to the main body of the printer 10 from the front side, and a paper output tray 320 to which sheets of paper on which images have been formed are stacked. The printer 10 may be configured to have more than one sheet supply cassettes and more than one paper output trays.

Figure 3:
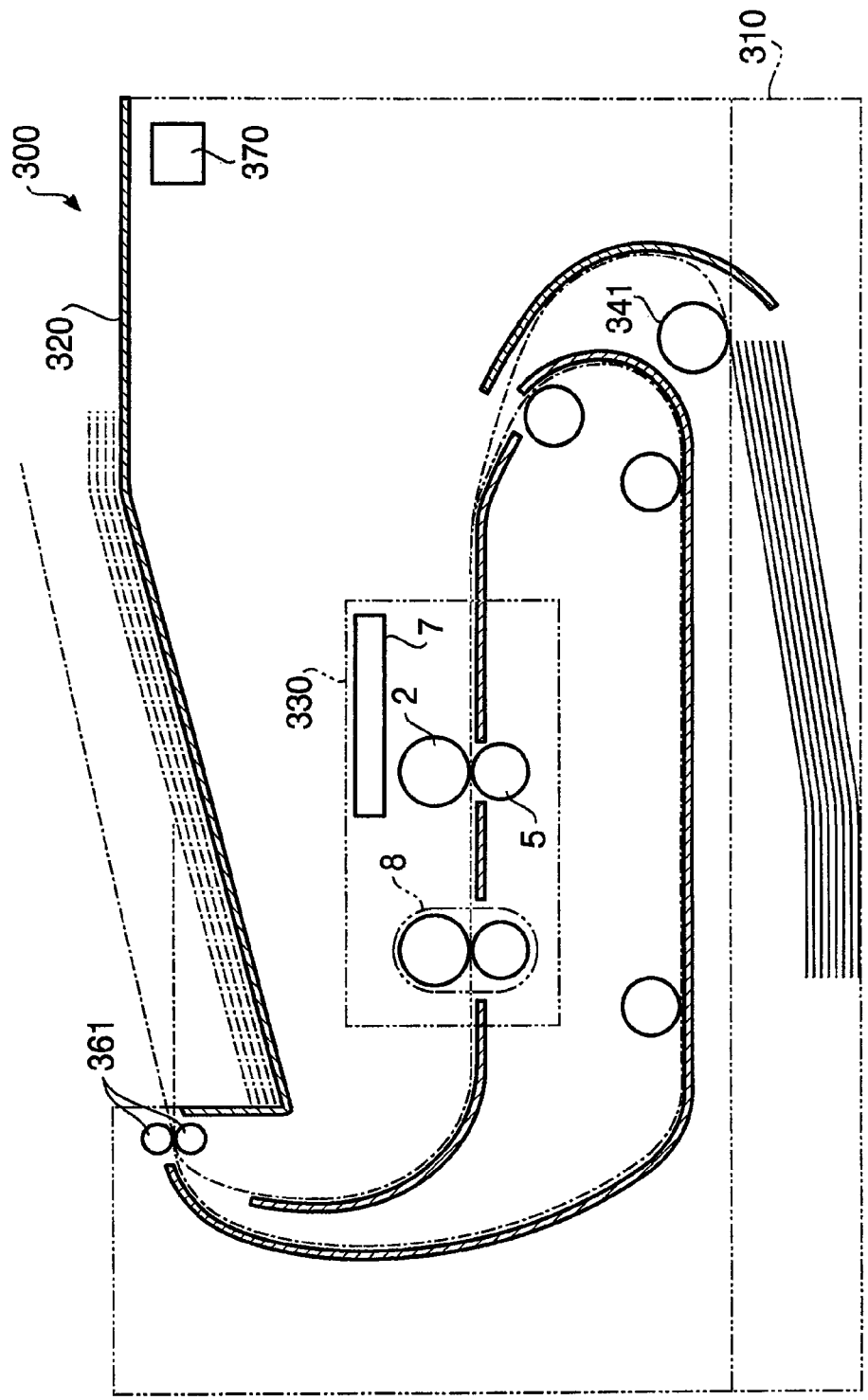
FIG. 3 is a schematic diagram illustrating an internal structure of an image formation unit of the printer.

FIG. 3 is a schematic diagram illustrating an internal structure of the image formation unit 300 of the printer 10. As shown in FIG. 3, the image formation unit 300 includes a print unit 330 configured to form a toner image through an electrophotographic process, a sheet supply roller 341 which supplies a sheet of paper placed in the sheet supply cassette 310 to the print unit 330, ejection rollers 361 which eject the sheet of paper to the paper output tray 320, and an IC tag reader 370 configured to read information from an IC tag through a wireless signal.

Figure 4:
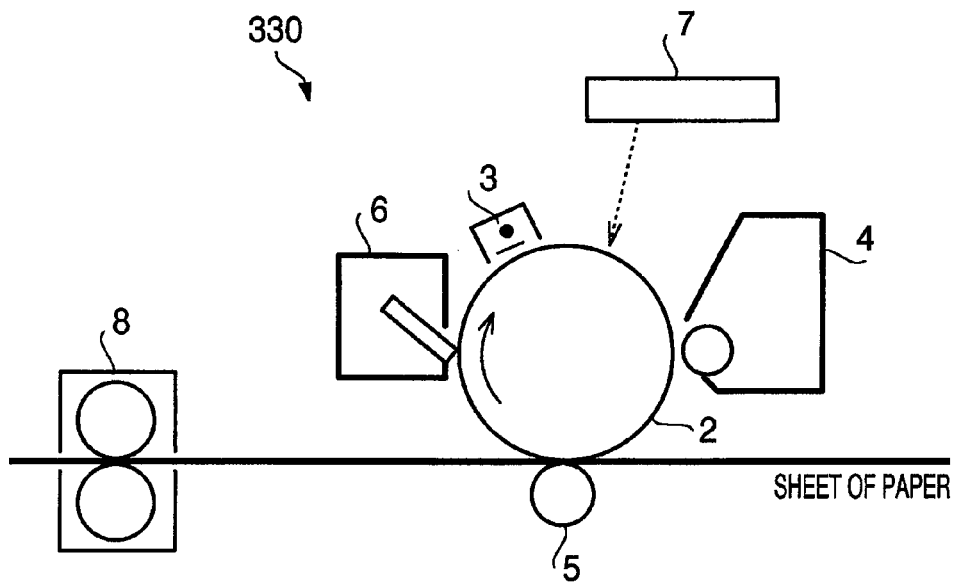
FIG. 4 is a schematic diagram illustrating an internal structure of a print unit of the printer.

FIG. 4 is a schematic diagram illustrating an internal structure of the print unit 330. The print unit 330 includes a laser emission device 7, a photosensitive drum 2, a transfer unit 5 having a form of a roller, and a fixing unit 8. Further, in the print unit 330, a charge unit 3, a developing unit 4 and a cleaning unit 6 are provided to surround the photosensitive drum 2. A laser beam emitted by the laser emission device 7 impinges on the photosensitive drum 2 at a position which is on the downstream side of the charge unit 3 and on the upstream side of the developing unit 4. The fixing unit 8 is located on a downstream side of the transfer unit 5 along a paper feeding path.

The laser emission device 7 controls emission of the laser beam in accordance with image data to scan on an outer circumferential surface of the photosensitive drum 2. The image data is created based on an image read by the image reading unit 200. The image data may be transmitted from the PC 20a, 20b or 20c through the network 40.

The photosensitive drum 2 rotates in a state where the outer circumferential surface of the photosensitive drum 2 is electrically charged uniformly by the charge unit 3. On the outer circumferential surface of the photosensitive drum 2, potentials of portions illuminated by the laser beam from the laser emission unit 7 are changed. Therefore, on the outer circumferential surface of the photosensitive drum 2, a latent image is formed by the differences in potential between illuminated portions and not illuminated portions.

Then, toner is supplied from the developing unit 4 to the outer circumferential surface of the photosensitive drum 2 to develop a toner image on the outer circumferential surface of the photosensitive drum 2. The toner image is then attracted electrically by the transfer unit 5 placed to face the photosensitive drum 2, and is transferred to the sheet of paper passing along the paper feeding path between the photosensitive drum 2 and the transfer unit 5. The toner remaining on the outer circumferential surface of the photosensitive drum 2 after the image is transferred to the sheet of paper is recaptured mechanically or electrically by the cleaning unit 6 so that the outer circumferential surface of the photosensitive drum 2 is cleaned. The fixing unit 8 applies heat and pressure to the sheet of paper on which the image has been transferred so that the image is fixed.

As shown in FIG. 3, the IC tag reader 370 is located near an upper wall of the image formation unit 300. The IC tag reader 370 receives a wireless signal from an IC tag. More specifically, the IC tag reader 370 transmits a wireless signal in predetermined time intervals. The IC tag which received the wireless signal from the IC tag reader 370 returns a wireless signal carrying information of the IC tag. Then, the IC tag reader 370 which received the wireless signal from the IC tag obtains the information from the received signal.

Figure 5:
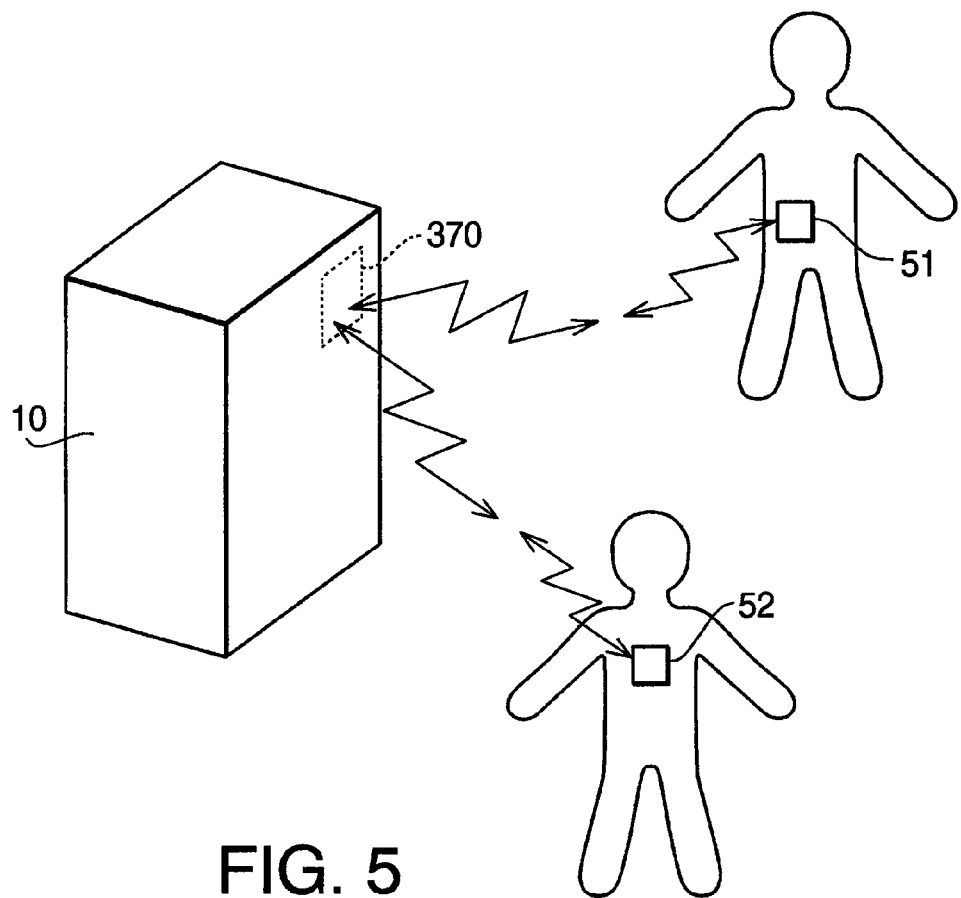
FIG. 5 is an explanatory illustration for explaining a situation where users carrying IC tags are around the printer.

FIG. 5 is an explanatory illustration for explaining a situation where users carrying IC tags are around the printer 10 (the IC tag reader 370). As shown in FIG. 5, when users carrying IC tags 51 and 52 are around the printer 10, the IC tag 370 receives wireless signals and obtains information concerning the users from the received wireless signals. More specifically, the IC tag 370 obtains a user ID of the user carrying the IC tag 51 from the wireless signal received from the IC tag 51, and obtains a user ID of the user carrying the IC tag 52 from the wireless signal received from the IC tag 52.

The IC tag reader 370 is able to communicate with an IC tag located within a predetermined range from the IC tag reader 370. Therefore, the IC tag reader 370 is able to receive a wireless signal from an IC tag of a user and identify the user if the user is within the predetermined range from the IC tag reader 370.

The printer 10 controls the IC tag reader 370 to obtain, at predetermined time intervals, user IDs of users who are around the printer 10 and to calculate, for each of the users who are around the printer, a waiting time for waiting for print out of a document. In the printer 10, the waiting time of each user is recorded in a waiting time table. Calculation of the waiting time will be explained in detail later.

The operation unit 400 is an input/output device having a flat panel structure, and is provided with a plurality of types of switches and buttons used by a user to operate the printer 10. The operation unit 400 includes a copy button 410 used to start a copying operation. In the operation unit 400, a display panel 420 on which various types of messages including an error message and a notification to a user are displayed is also provided.

Figures 6, 7:
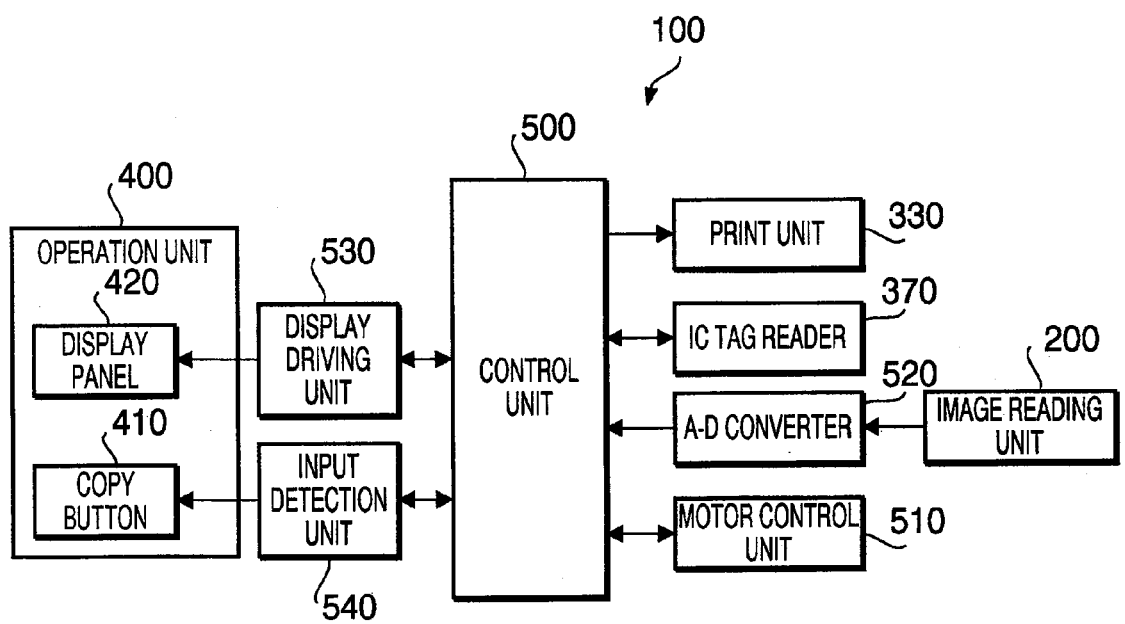
FIG. 6 illustrates an example of a screen representing waiting times of users displayed on a display panel of the printer.
FIG. 7 is a block diagram of a control system of the printer.

On the display panel 420, the waiting time of each user recorded in the waiting time table is also displayed. FIG. 6 illustrates an example of a screen representing the waiting times of users displayed on the display panel 420. As shown in FIG. 6, on the screen, a user name, a job name and a waiting time are displayed for each of the users. Further, on the screen of FIG. 6, the users are aligned in order of decreasing waiting time. Further, on the screen of FIG. 6, display fields of "user A" who is not around the printer 10 at the moment are hatched. Through the screen shown in FIG. 6, each user is able to know priority of the user's print job. Such a configuration also makes it possible to prevent each user from having uncomfortable feeling when execution of the user's print job is delayed.

Hereafter, a control system of the printer 10 is explained with reference to FIG. 7. As shown in FIG. 7, the printer 10 includes a control unit 500, a motor control unit 510, an A-D converter 520, a both-side driving unit 530, an input detection unit 540, the print unit 330 and the IC tag reader 370. These units 510, 520, 530, 540, 330 and 370 are connected to the control unit 500.

The control unit 500 has the function of controlling the functions of the printer 10. That is, the control unit 500 executes various programs to achieve the functions of the printer 10. The control unit 500 measures a waiting time based on information obtained from an IC tag. The motor control unit 510 controls various types of motors for driving various rollers in the image reading unit 510 and the image formation unit 300. The A-D converter 520 digitizes an image read by the image reading unit 200 to create image data corresponding to the read image.

The display driving unit 530 controls the display panel 420 to display various types of information on the display panel 420. The input detection unit 540 has a function of detecting an input through the copy button 410 provided on the operation unit 400. To the input detection unit 540, other buttons of the operation unit 400 are also connected.

Figure 8:
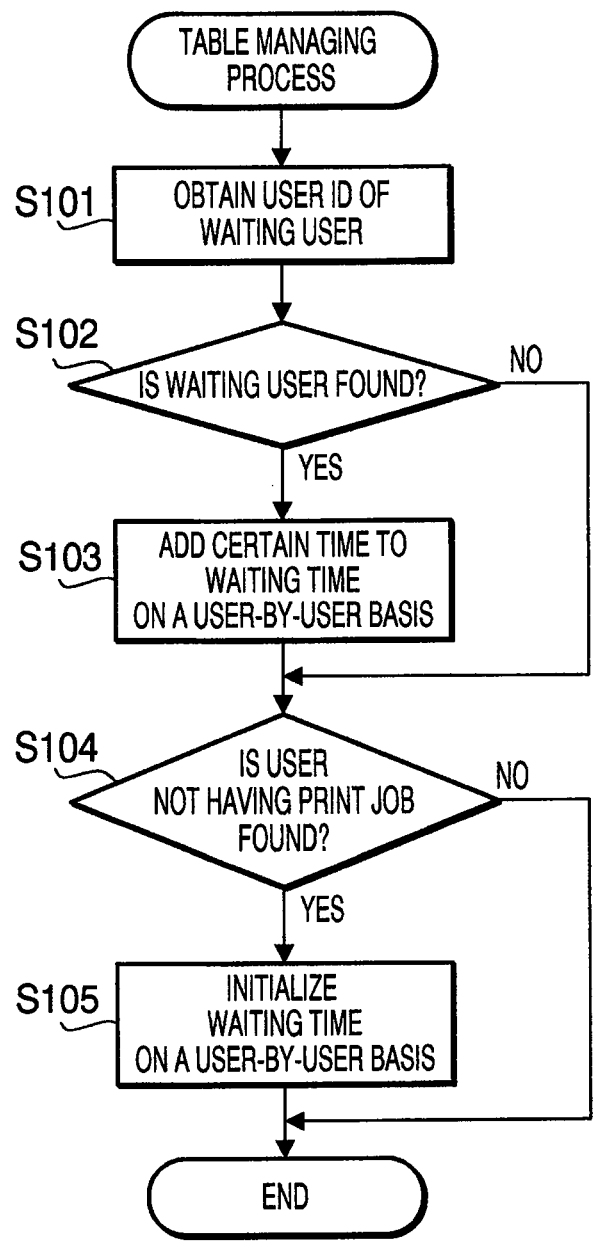
FIG. 8 is a flowchart illustrating a table managing process of a waiting time table executed by the printer.

Hereafter, a table managing process for a waiting time table is explained with reference to FIG. 8. The table managing process is executed under control of the control unit 500 of the printer 10. The table managing process is executed repeatedly at a time interval of T seconds (e.g., one second).

First, the control unit 500 controls the IC tag reader 370 to obtain information concerning users (hereafter, referred to as waiting users) who are around the printer 10 (step S101).

Then, the control unit 500 judges whether a waiting user is found (step S102). If a waiting user is found (S102: YES), the control unit 500 performs an addition for the waiting time of the found user (step S103). More specifically, the control unit 500 adds T seconds to the waiting time of the found user who has been found at the stage of the immediately preceding execution of the table managing process. That is, if the same user ID is obtained successively in repetitive execution of the table managing process, the waiting time of the user corresponding to the same user ID is updated. If a user who has not been recorded in the waiting time table is found (S102: NO), control proceeds to step S104 without processing step S103.

Next, the control unit 500 consults the waiting time table to judge whether a user who does not have a print job is found (step S104). If a user who does not have a print job is found (S104: YES), the control unit 500 initializes the waiting time of the user who does not have a print job (step S105). If the waiting time of the user is increased regardless of the fact that the user does not have a print job, the waiting time of a user having the higher frequency of use of the printer 10 is increased and therefore the priority of execution of a print job of such a user having the higher frequency of use of the printer 10 is increased. In this case, the priority of execution of print jobs may become different from the actual immediacy of execution of print jobs.

For this reason, in this embodiment, the waiting time of the user who does not have a print job is reset. If a user who does not have a print job is not found in the waiting time table (S104: NO), the table managing process terminates without processing step S105.

Therefore, in this embodiment, the waiting time of a user is not reset as long as a print job remains in a print queue. If a user has a plurality of waiting time zones, the waiting time of the user is calculated by adding together the plurality of waiting time zones. Such spread of waiting time is caused, for example, in a situation where a user moves in an area where the printer 10 is installed. Even if a user moves in the area where the printer 10 is installed and the waiting time is divided into a plurality of waiting time zones, the waiting time of the user is obtained properly by adding together the plurality of waiting time zones. With this configuration, it becomes possible to prevent the user who temporarily gets away from the printer 10 to get a consumable product (e.g., sheets of paper) for the printer 10, from suffering disadvantages of getting away from the printer 10.

Figures 9, 10:
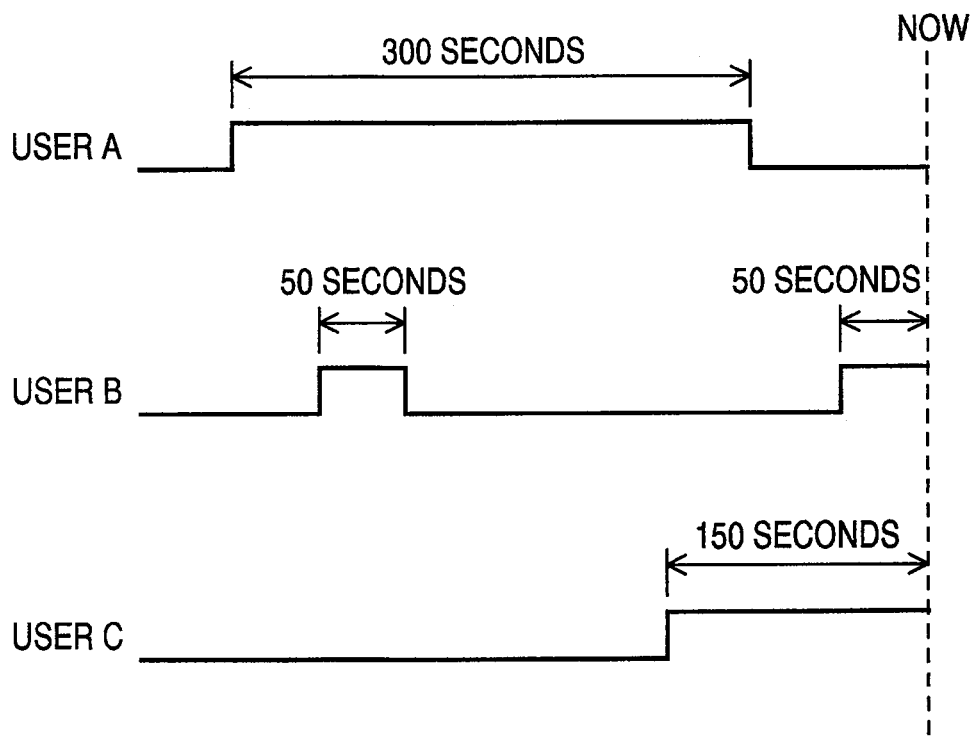
FIG. 9 is an example illustrating waiting time zones of three users.
FIG. 10 is an example of a waiting time table corresponding to a situation shown in FIG. 9.

Considering that three users (users A, B and C) are in the area where the printer 10 is installed and the presence of each user is detected by the printer 10 as indicated in FIG. 9, the printer 10 creates the waiting time table shown in FIG. 10. As can be seen from FIG. 9, each of the users A and C has been around the printer 10 for a continuous period of time. Therefore, the continuous period of time of 300 seconds is calculated as the waiting time of the user A, and the continuous period of time of 150 seconds is calculated as the waiting time of the user B.

On the other hand, the user B has a plurality of waiting time zones because the user B temporarily got away from the printer 10. In this case, the sum (100 seconds) of the waiting time zone of 50 seconds and the waiting time zone of 50 seconds is calculated as the waiting time of the user B. The calculated waiting times of the users A, B and C are thus recorded in the waiting time table.

Figure 11:
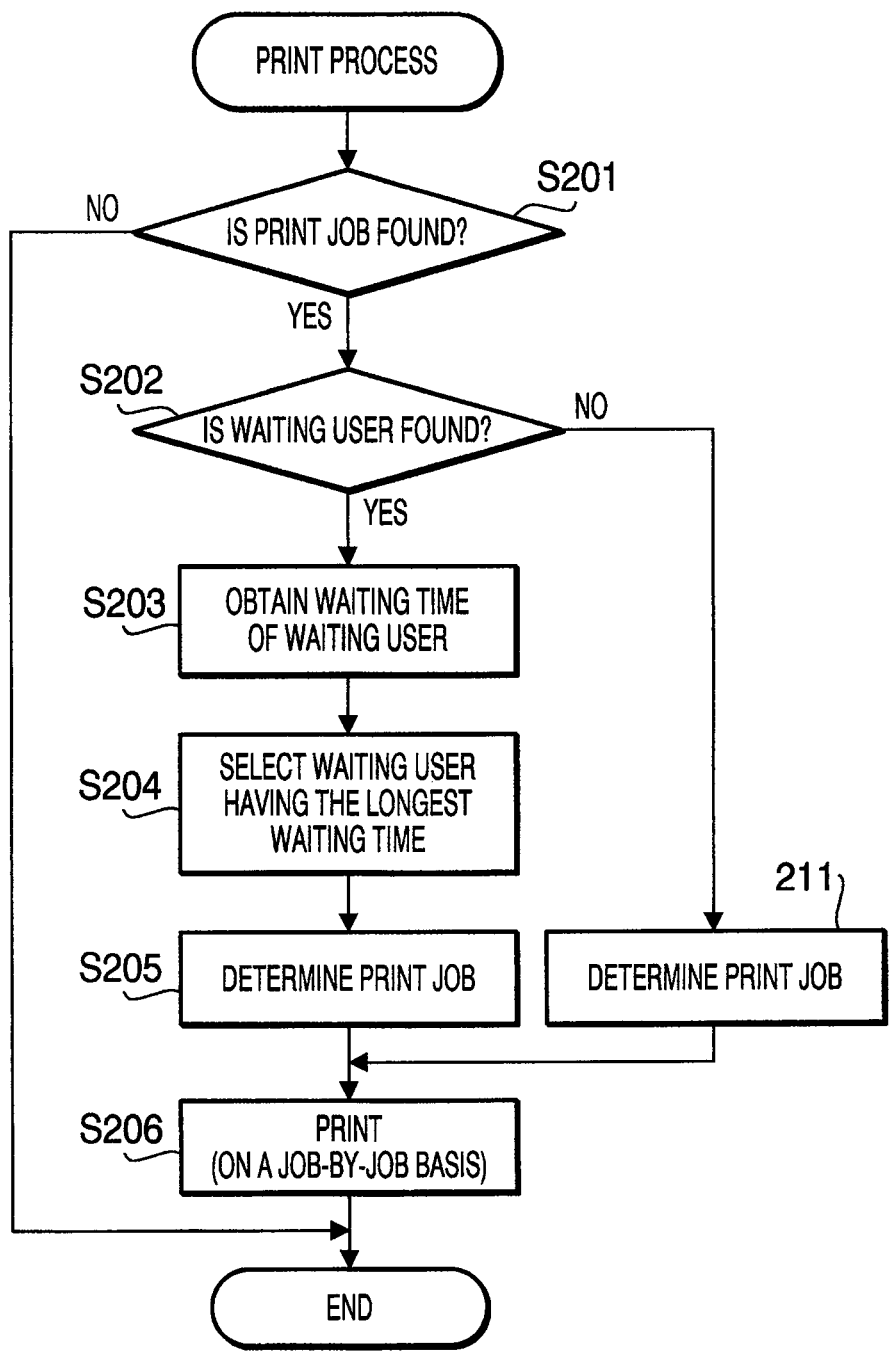
FIG. 11 is a flowchart illustrating a print process executed by the printer.

Hereafter, a print process is explained with reference to FIG. 11. The print process shown in FIG. 11 is executed periodically, for example, at a time interval of 1 second, under control of the control unit 500 of the printer 10.

First, the control unit 500 checks the presence or absence of a print job (step S201). If no print job is found (S201: NO), the print process terminates. If a print job is found (S201: YES), the control unit 500 controls the IC tag reader 370 to try to obtain information from an IC tag of a waiting user to check the presence or absence of a waiting user (step S202).

If no waiting user is found (S202: NO), the control unit selects a first one of print jobs in the print queue (i.e., the oldest print job of all of the print jobs stored in the print queue is selected as a target of printing) (step S211). That is, in this case, the order of execution of the print jobs is not changed.

After step S211 is processed, control proceeds to step S206 to execute the printing operation for the selected print job.

If a waiting user is found (S202: YES), the control unit 500 consults the waiting time table to obtain the actual waiting time of the found waiting user (step S203). Regarding the situation shown in FIGS. 9 and 10, the waiting time of the user B and the waiting time of the user C are obtained from the waiting time table, but the waiting time of the user A is not obtained from the waiting time table because the user A is at a location away from the printer at the moment.

Next, the control unit 500 selects the waiting user having the longest waiting time from the waiting users whose waiting times are obtained in step S203 (step S204). Regarding the situation shown in FIGS. 9 and 10, the user C is selected because the user C has the longest waiting time, although the user B appeared around the printer 10 earlier than the user C. Then, a first print job of all of the print jobs belonging to the selected user is targeted for the printing operation (step S205). Then, the selected print job is executed (step S206).

Thus, the print job of the user who is waiting in front of the printer 10 and has the longest waiting time is executed preferentially. In other words, even if a plurality of users are around the printer 10, the ordinal ranks of execution of print jobs of the users do not conflict with each other. Therefore, the printing operation can be executed appropriately. After step S206 is processed, the print process terminates.

As described above, after one print job is finished and a predetermined time interval has elapsed, the print process is executed again. That is, if a print job remains in the print queue after one print job is finished, the print process is executed again to further execute a next print job in the print queue.

Regarding the situation shown in FIGS. 9 and 10, there is a possibility that the user A comes back to the printer 10 again and the user C gets away from the printer 10. That is, environmental condition changes from moment to moment. For this reason, in this embodiment, the priority of execution of a print job is defined each time execution of a print job is finished.

Hereafter, a variation of the table managing process for a waiting time table is explained with reference to FIG. 12. According to the table managing process shown in FIG. 11, the waiting time is calculated with respect to each of the users. Therefore, if a particular user is around the printer 10 for a relatively long time period, print jobs of the particular user may be processed successively. In this case, if the particular user adds a new print job in the print queue in a later stage, the new print job is processed preferentially with respect to print jobs of other users. In this case, other users may have uncomfortable feeling because their print jobs are delayed. The variation of the table managing process shown in FIG. 12 is configured in consideration of such an inconvenience.

Figure 12:
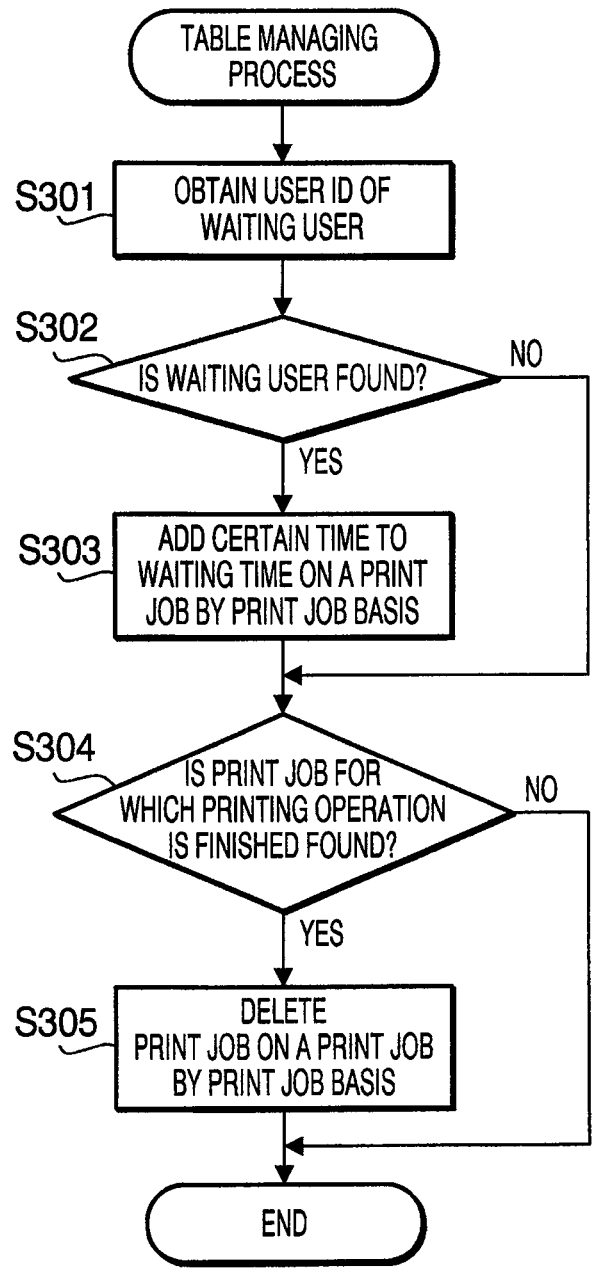
FIG. 12 is a flowchart illustrating a table managing process of a waiting time table configured as a variation of the table managing process shown in FIG. 10.

As described in detail below, the table managing process shown in FIG. 12 is configured to obtain the waiting time on a print job by print job basis.

The table managing process shown in FIG. 12 is executed repeatedly at a predetermined time interval of T seconds (e.g. one second), under control of the control unit 500.

First, the control unit 500 controls the IC tag reader 370 to obtain information of waiting users who are around the printer 10 (step S301). That is, the control unit 500 identifies each waiting user by extracting a user ID from the information obtained from the IC tag. Then, the control unit 500 judges whether a waiting user is found (step S302). If a waiting user is found (S302: YES), the control unit 500 performs an addition for the waiting time for each of the print jobs belonging to the found user (step S303).

More specifically, in step S303, the control unit 500 adds T seconds to the waiting time of each print job belonging to the found user who was around the printer 10 at the stage of the immediately preceding execution of the table managing process. With this configuration, the waiting time table having the waiting time calculated on a print job by print job basis can be created. FIG. 13 illustrates an example of the waiting time table created through the table managing process shown in FIG. 12. The example of the waiting time table shown in FIG. 13 represents the priority of execution of print jobs in a situation where all of the users A, B and C are waiting for execution of print jobs around the printer 10. If no waiting user is found (S302: NO), control proceeds to step S304 without processing step S303.

Next, the control unit 500 judges whether a print job for which the printing operation has finished is found (step S304). If a print job for which the printing operation has finished is found (S304: YES), the control unit 500 deletes the print job from the waiting time table (step S305). After step S305 is processed, the table managing process terminates. If no print job for which the printing operation has finished is found (S304: NO), the table managing process terminates.

It should be noted that a print process which is substantially the same as that shown in FIG. 11 can also be executed in cooperation with the table managing process shown in FIG. 12. However, if the print process shown in FIG. 11 is executed with the table managing process shown in FIG. 12, the print process is executed as indicated below to support the waiting time table in which the waiting time is stored on a print job by print job basis.

That is, when the print process is executed with the table managing process shown in FIG. 12, the control unit 500 consults the waiting time table to obtain the waiting time of each of waiting users who are around the printer 10 at the moment (steps S201 to S203). Then, the control unit 500 selects a print job corresponding to the longest waiting time from among the print jobs obtained through steps S201 to S203.

Regarding the waiting time table shown in FIG. 13, the job 1 of the user A has the longest waiting time. Therefore, in this case, the job 1 is selected as a print target in step S205. On the other hand, if the user A is not around the printer 10 at the moment (i.e., if the users B and C are found but the user A is not found in step S202), the job 2 of the user B is selected as a print target in step S205.

After step S205 is processed, the selected print job is executed (step S206). Through the above described print process, the print job which has the longest waiting time and which belongs to the user who is around the printer 10 at the moment is executed preferentially. In other words, according to the above described print process and the table managing process shown in FIG. 12, even if a plurality of waiting users are around the printer 10, control of execution of print jobs can be achieved properly such that the ordinal ranks of execution of print jobs of the users do not conflict with each other.

As described above, in the print system 100 according to the embodiment, the IC tag reader 370 accesses IC tags around the printer 10 (i.e., the IC tag reader 370) and obtains user IDs stored in the IC tags. As a result, users who are around the printer 10 are identified. Then, the printer 10 measures the waiting time for each of users (or for each of print jobs). That is, in the print system 100, the waiting time is managed on a user-by-user basis (or on a print job by print job basis).

Further, the printer 10 executes the print job of the user having the longest waiting time or the print job having the longest waiting time preferentially relative to the other jobs.

With this configuration, even if a plurality of users are waiting around the printer 10, it is possible to select an print job to which the top priority of executing the printing operation should be assigned, from among print jobs of all of the waiting users. Consequently, it is possible to execute the print jobs smoothly and appropriately.

In the print system 100, if the waiting time of a user (or a print job) is divided into a plurality of waiting time zones, the sum of the waiting time zones are calculated and the sum is defined as the waiting time of the user (or the print job).

If the waiting time is reset each time a user gets away from the printer 10, the waiting time of the user elapsed before the user gets away from the printer 10 is lost. In other words, the user is required to be around the printer 10 until the user's print job is finished. By contrast, according to the embodiment, the plurality of time zones are added together and the sum is defined as the waiting time of the user. Therefore, it is possible to select a print job appropriately for all of users of the print system 100. Such a configuration enhances usability of the printer 10.

It is assumed that print jobs belonging to users who are actually waiting around the printer 10 have immediacy higher than that of print jobs belonging to users who are not around the printer 10. In this regard, in the print system 100, a target print job to be executed is selected from among print jobs belonging to users who are waiting around the printer 10 when the printer 10 determines the target print job. That is, the printer 10 selects a print job to be executed next from among print jobs of users who are actually waiting around the printer 10. Therefore, according to the embodiment, usability of the printer 10 can be enhanced.

Although the present invention has been described in considerable detail with reference to certain preferred embodiments thereof, other embodiments are possible.

In the above described embodiment, a printer functioning as an image forming device is employed to achieve the various functions of the print system. However, in the print system, various types of image forming devices, such as a copying device, a scanner and a facsimile device may be employed.

In the above mentioned embodiment, an electrophotographic process is employed in the print unit of the printer. However, various types of image formation processes, such as an inkjet print process, may be employed in the print unit. The image forming device may be configured to be capable of forming color images or may be a dedicated image forming device for monochrome printing.

In the above described embodiment, the IC tag reader 370 is incorporated in the printer 10. However, the IC tag reader 370 may be an external device configured to be detachably attachable to the printer 10.

Alternatively, an IC tag reader may be installed in the print system separately from the printer 10. For example, an IC tag reader may be attached to a ceiling near the printer 10.

In the above described embodiment, the measurement of the waiting time and the management of the waiting time table are conducted by the printer 10. However, an information processing device may be additionally provided in the print system. In this case, the measurement of the waiting time and the management of the waiting time table may be conducted by the information processing device connected to the printer 10 (and the IC tag reader 370).

In the above described table managing process for a waiting time table, the waiting time table is managed by increasing the waiting time of each user who is around the printer 10 by adding a predetermined time (T seconds) to the waiting time of such a user. However, the management of the waiting time table is not limited to such a configuration.

For example, regarding a user who is not around the printer, the printer may subtract a time period for which the user is not around the printer, from the waiting time of such a user.

Alternatively, the waiting time may be calculated by assigning different weighting factors to different users (or to different jobs). For example, if different weighting factors are assigned to different users, the waiting time of a particular user is calculated by adding a time obtained by multiplying a certain time period (e.g., T seconds) by a waiting factor assigned to the particular user, to the waiting time of the particular user in the waiting time table.

In the print process, a target print job to be executed is selected from among print jobs belonging to users who are actually around the printer when the printer selects the target print job. However, selection of a target print job is not limited to such a configuration. For example, the printer may simply select a print job which is the longest waiting time regardless of whether the users in the waiting time table are actually around the printer. In this case, regarding the waiting times of the users A, B and C shown in FIG. 10, the printer assigns the top priority, the second priority and the third priority to the users A, C and B, respectively.

In the print process, the priority of execution of a printing operation is determined on a print job by print job basis. However, the printer may be configured to execute a printing operation on a page-by-page basis, and to determine the priority of execution of a printing operation on a page-by-page basis.

The printer may be configured to have a configuration for preventing occurrence of mixture of a plurality of print jobs. For example, as a configuration for preventing occurrence of mixture of a plurality of print jobs, the printer may have a function of ejecting a divider for discriminating between outputs of different print jobs, a function of shift-ejection in which outputs of different print jobs are shifted with respect to each other on an paper output tray, or a function of dual orientation ejection in which outputs of different print jobs are differently oriented on the paper output tray.

The printer may be configured to have a plurality of paper output trays. In this case, the printer may eject outputs of different jobs on different paper output trays, respectively.

Although in each of the examples of waiting time tables shown in FIGS. 10 and 13, the priority levels of execution of print jobs are included in the waiting time table in association with each user or each print job, the waiting time table may be configured not to have fields for the priority levels. That is, the printer may be configured to obtain the priority levels of execution of print jobs only for the purpose of representation on the display panel.

What is claimed is:

1. A print system, comprising:
   a user ID obtaining unit configured to obtain a user ID from a memory device through wireless communication when the memory device is located within a predetermined range from the print system, wherein the user ID corresponds to a print job waiting to be executed by the print system;
   at least one processor;
   memory storing computer-readable instructions that, when executed by the at least one processor, cause the at least one processor to provide:
   a waiting time obtaining unit configured to obtain time information, which corresponds to a waiting time, responsive to the user ID obtaining unit obtaining the user ID from the memory device, wherein the waiting time obtaining unit updates the waiting time responsive to each occurrence of the user ID obtaining unit obtaining the user ID from the memory device prior to the print job corresponding to the user ID being executed by the print system; and a print control unit configured to select a print job in accordance with the obtained time information, from a plurality of print jobs, and to execute the selected print job.

2. The print system according to claim 1, wherein the print control unit is configured to select a user having a longest waiting time from a plurality of users whose user IDs have been obtained by the user ID obtaining unit and to execute a print job of the selected user.

3. The print system according to claim 1, wherein the waiting time obtaining unit obtains the time information by multiplying the waiting time by a predetermined weighting factor.

4. The print system according to claim 1, wherein:
the waiting time obtaining unit obtains the time information on a user-by-user basis; and
the print control unit selects a print job of a user having the waiting time longer than the waiting time of another user and executes the selected print job.

5. The print system according to claim 4, wherein:
the user ID obtaining unit obtains the user ID at predetermined time intervals; and
if a same user ID is obtained successively, the waiting time obtaining unit increases cumulatively, the waiting time corresponding to the successively obtained same user ID.

6. The print system according to claim 5, wherein the waiting time obtaining unit is configured such that if a certain user has a plurality of separately spread waiting time zones, the waiting time obtaining unit obtains a sum of the plurality of waiting time zones and defines the sum as the waiting time of the certain user.

7. The print system according to claim 1, wherein the waiting time obtaining unit initializes the waiting time of a print job which does not remain in a print queue.

8. The print system according to claim 1, wherein:
the waiting time obtaining unit obtains the time information on a print job by print job basis; and
the print control unit selects a print job having a longest waiting time and executes the selected print job.

9. The print system according to claim 8, wherein:
the user ID obtaining unit obtains the user ID at predetermined time intervals; and
if a same user ID is obtained successively, the waiting time obtaining unit increases cumulatively the waiting time of a print job corresponding to the successively obtained same user ID.

10. The print system according to claim 9, wherein the waiting time obtaining unit is configured such that if a certain print job has a plurality of separately spread waiting time zones, the waiting time obtaining unit obtains a sum of the plurality of waiting time zones and defines the sum as the waiting time of the certain print job.

11. The print system according to claim 1, wherein the print control unit selects a print job to be executed next each time a predetermined condition is satisfied.

12. The print system according to claim 11, wherein the predetermined condition includes completion of a preceding print job.

13. The print system according to claim 1, wherein the print control unit selects a print job from a plurality of print jobs corresponding to user IDs obtained by the user ID obtaining unit at a stage where the print control unit operates to select a print job.

14. The print system according to claim 1, further comprising an indication unit configured to indicate the waiting time obtained by the waiting time obtaining unit.

15. The print system according to claim 14, wherein the indication unit displays information concerning priority of execution of a printing operation on a print job by print job basis.

16. The print system according to claim 14, wherein the indication unit displays information concerning priority of execution of a printing operation on a user-by-user basis.

17. The print system according to claim 1, wherein the print system is an image forming device.

18. The print system of claim 17, wherein the print control unit is configured to select a user having a longest waiting time from a plurality of users whose user IDs have been obtained by the user ID obtaining unit and to execute a print job of the selected user.

19. At least one non-transitory computer-readable medium having computer-readable instructions stored thereon that, when executed, cause at least one computing device to:
obtain a user ID from a memory device through wireless communication when the memory device is located within a predetermined range from a print system, wherein the user ID corresponds to a print job waiting to be executed;
obtain time information, which corresponds to a waiting time, responsive to obtaining the user ID from the memory device;
updating the waiting time responsive to each occurrence of obtaining the user ID from the memory device prior to the print job corresponding to the user ID being executed;
select a print job from a plurality of print jobs in accordance with the obtained time information; and
execute the selected print job.

20. The at least one non-transitory computer-readable medium of claim 19, wherein selecting a print job from a plurality of print jobs includes:
selecting a user having a longest waiting time from a plurality of users whose user IDs have been obtained; and
selecting a print job of the selected user.

* * * * *